(12) United States Patent
Gillespie, III et al.

(10) Patent No.: US 8,690,977 B2
(45) Date of Patent: Apr. 8, 2014

(54) GARBAGE IN POWER OUT (GIPO) THERMAL CONVERSION PROCESS

(75) Inventors: Michael Joseph Gillespie, III, Bridgewater, NJ (US); Christopher Paul Gillespie, Ridgefield, CT (US)

(73) Assignee: Sustainable Waste Power Systems, Inc., Ridgefield, CT (US)

( * ) Notice: Subject to any disclaimer, the term of this patent is extended or adjusted under 35 U.S.C. 154(b) by 651 days.

(21) Appl. No.: 12/491,416

(22) Filed: Jun. 25, 2009

(65) Prior Publication Data
US 2010/0330441 A1 Dec. 30, 2010

(51) Int. Cl.
*C01B 3/36* (2006.01)
(52) U.S. Cl.
USPC .......................................... 48/197 R
(58) Field of Classification Search
None
See application file for complete search history.

(56) References Cited

U.S. PATENT DOCUMENTS

| | | | |
|---|---|---|---|
| 3,962,300 A | 6/1976 | Hiller et al. | |
| 3,971,636 A * | 7/1976 | Matthews | 48/202 |
| 4,097,361 A * | 6/1978 | Ashworth | 208/408 |
| 4,098,324 A | 7/1978 | Kummel et al. | |
| 4,099,374 A | 7/1978 | Foster-Pegg | |
| 4,113,615 A * | 9/1978 | Gorbaty | 210/694 |
| 4,324,640 A | 4/1982 | Durai-Swamy | |
| 4,346,302 A | 8/1982 | Bozzuto | |
| 4,353,713 A | 10/1982 | Cheng | |
| 4,375,362 A | 3/1983 | Moss | |
| 4,386,941 A | 6/1983 | Crouch et al. | |
| 4,435,374 A | 3/1984 | Helm, Jr. | |
| 4,448,588 A | 5/1984 | Cheng | |
| 4,452,611 A | 6/1984 | Richey | |
| 4,457,764 A | 7/1984 | Dorling et al. | |
| 4,470,255 A | 9/1984 | Rowlands et al. | |
| 4,490,157 A | 12/1984 | Fernandes | |
| 4,537,603 A | 8/1985 | Firey | |
| 4,583,992 A | 4/1986 | Rogers | |
| 4,586,442 A | 5/1986 | Caughey | |
| 4,592,762 A | 6/1986 | Babu et al. | |
| 4,597,771 A | 7/1986 | Cheng | |
| 4,604,105 A | 8/1986 | Aquino et al. | |
| 4,617,027 A | 10/1986 | Lang | |
| 4,652,430 A | 3/1987 | Michel et al. | |
| 4,680,035 A | 7/1987 | Tanca | |
| 4,699,632 A | 10/1987 | Babu et al. | |
| 4,720,289 A | 1/1988 | Vaugh et al. | |
| 4,734,166 A | 3/1988 | Angelo, II | |
| 4,829,911 A | 5/1989 | Nielson | |
| 4,851,151 A | 7/1989 | Najjar et al. | |
| 4,854,249 A | 8/1989 | Khinkis et al. | |
| 4,854,937 A * | 8/1989 | Meyer et al. | 44/280 |
| 4,867,756 A | 9/1989 | Patel | |
| 4,891,157 A | 1/1990 | dePaz et al. | |
| 4,922,839 A | 5/1990 | Boucher | |
| 4,938,862 A | 7/1990 | Visser et al. | |

(Continued)

*Primary Examiner* — Imran Akram
(74) *Attorney, Agent, or Firm* — Fox Rothschild LLP; Gerard P. Norton; Robert N. Henrie, II

(57) ABSTRACT

A system for gasifying a carbonaceous feedstock, such as municipal waste, to generate power includes a devolatilization reactor that creates char from the feedstock and a gasifier that creates a product gas from both the char and from volatiles released when devolatilizing the feedstock. The product gas is reacted in a fuel cell to create electrical energy and process heat. The process heat is used to heat the devolatilization reactor and the gasifier. The gasifier comprises a plurality of configurable circuits that can each be tuned to meet the individual needs of the char material being gasified.

11 Claims, 5 Drawing Sheets

(56) References Cited

U.S. PATENT DOCUMENTS

| | | |
|---|---|---|
| 4,967,673 A | 11/1990 | Gunn |
| 4,971,683 A | 11/1990 | Meyer et al. |
| 4,976,940 A | 12/1990 | Paulson |
| 4,983,782 A | 1/1991 | Merz et al. |
| 4,987,954 A | 1/1991 | Boucher |
| 5,007,804 A | 4/1991 | Boucher |
| 5,021,148 A | 6/1991 | Meyer et al. |
| 5,050,511 A | 9/1991 | Hallett et al. |
| 5,059,404 A | 10/1991 | Mansour et al. |
| 5,069,685 A | 12/1991 | Bissett et al. |
| 5,070,821 A | 12/1991 | Virr |
| 5,092,984 A | 3/1992 | Babu et al. |
| 5,110,452 A | 5/1992 | Meyer et al. |
| 5,125,931 A | 6/1992 | Schulz |
| 5,132,007 A | 7/1992 | Meyer et al. |
| 5,133,780 A | 7/1992 | Sadowski |
| 5,134,841 A | 8/1992 | Rehwinkel et al. |
| 5,139,535 A | 8/1992 | Strickland et al. |
| 5,145,490 A | 9/1992 | Sadowski |
| 5,164,054 A | 11/1992 | Cha et al. |
| 5,171,406 A | 12/1992 | Shang et al. |
| 5,226,927 A | 7/1993 | Rundstrom |
| 5,232,679 A | 8/1993 | Jha et al. |
| 5,240,592 A | 8/1993 | Meyer et al. |
| 5,255,507 A | 10/1993 | Gounder |
| 5,266,086 A | 11/1993 | Bailey et al. |
| 5,280,701 A | 1/1994 | Tolman |
| 5,293,843 A | 3/1994 | Provol et al. |
| 5,306,481 A | 4/1994 | Mansour et al. |
| 5,322,530 A | 6/1994 | Merriam et al. |
| 5,339,621 A | 8/1994 | Tolman |
| 5,362,451 A | 11/1994 | Cha |
| 5,425,793 A | 6/1995 | Mori et al. |
| 5,427,762 A | 6/1995 | Steinberg et al. |
| 5,455,011 A | 10/1995 | Kitto, Jr. |
| 5,466,383 A | 11/1995 | Lee |
| 5,507,846 A | 4/1996 | Coffman |
| 5,512,070 A | 4/1996 | Stats |
| 5,516,345 A | 5/1996 | Brown |
| 5,536,488 A | 7/1996 | Mansour et al. |
| 5,543,117 A | 8/1996 | Kitto, Jr. |
| 5,554,202 A | 9/1996 | Brooker et al. |
| 5,560,900 A | 10/1996 | Gbordzoe et al. |
| 5,589,599 A | 12/1996 | McMullen et al. |
| 5,611,289 A | 3/1997 | Brookes |
| 5,620,487 A | 4/1997 | Andrus, Jr. |
| 5,622,534 A | 4/1997 | Andrus, Jr. |
| 5,630,853 A | 5/1997 | Eales |
| 5,632,858 A | 5/1997 | Kitto, Jr. |
| 5,634,950 A | 6/1997 | McIlroy et al. |
| 5,637,192 A | 6/1997 | Mansour et al. |
| 5,645,616 A | 7/1997 | McIlroy et al. |
| 5,656,044 A | 8/1997 | Bishop et al. |
| 5,660,685 A | 8/1997 | Nilsson |
| 5,688,296 A | 11/1997 | Andrus, Jr. et al. |
| 5,728,271 A | 3/1998 | Piskorz et al. |
| 5,746,886 A | 5/1998 | Backlund et al. |
| 5,752,994 A | 5/1998 | Monacelli et al. |
| 5,755,837 A | 5/1998 | Beierle et al. |
| 5,755,838 A | 5/1998 | Tanaka et al. |
| 5,792,340 A | 8/1998 | Freel et al. |
| 5,849,050 A | 12/1998 | Wolf |
| 5,851,246 A | 12/1998 | Bishop et al. |
| 5,851,497 A | 12/1998 | Brooker et al. |
| 5,853,548 A | 12/1998 | Piskorz et al. |
| 5,895,508 A | 4/1999 | Halow |
| 5,937,652 A | 8/1999 | Abdelmalek |
| 5,946,900 A | 9/1999 | Rohrer |
| 6,005,149 A | 12/1999 | Bishop |
| 6,018,090 A | 1/2000 | Schmidt |
| 6,048,374 A | 4/2000 | Green |
| 6,112,677 A | 9/2000 | Kuntschar et al. |
| 6,134,916 A | 10/2000 | Jahnke |
| 6,149,765 A | 11/2000 | Mansour et al. |
| 6,162,266 A | 12/2000 | Wallace et al. |
| 6,168,425 B1 | 1/2001 | Fujinami et al. |
| 6,168,709 B1 | 1/2001 | Etter |
| 6,173,002 B1 | 1/2001 | Robert |
| 6,200,430 B1 | 3/2001 | Robert |
| 6,251,148 B1 | 6/2001 | Redepenning et al. |
| 6,532,879 B2 | 3/2003 | Abrams |
| 6,548,197 B1 | 4/2003 | Chandran et al. |
| 6,615,748 B2 | 9/2003 | Sunter et al. |
| 6,637,206 B2 | 10/2003 | Thiessen |
| 6,685,754 B2 | 2/2004 | Kindig et al. |
| 6,767,375 B1 | 7/2004 | Pearson |
| 6,805,773 B1 | 10/2004 | Brooker |
| 6,830,597 B1 | 12/2004 | Green |
| 6,832,565 B2 | 12/2004 | Chandran et al. |
| 6,863,878 B2 | 3/2005 | Klepper |
| 6,883,442 B1 | 4/2005 | Groszek et al. |
| 6,911,058 B2 | 6/2005 | Calderon et al. |
| 6,923,004 B2 | 8/2005 | Chandran et al. |
| 6,941,879 B2 | 9/2005 | Hahn et al. |
| 6,958,136 B2 | 10/2005 | Chandran et al. |
| 6,959,654 B2 | 11/2005 | Abrams |
| 6,960,234 B2 | 11/2005 | Hassett |
| 6,972,144 B2 | 12/2005 | Roth et al. |
| 6,981,455 B2 | 1/2006 | Lefcort |
| 6,997,118 B2 | 2/2006 | Chandran et al. |
| 7,008,967 B2 | 3/2006 | Keyser et al. |
| 7,077,878 B1 | 7/2006 | Muhlen et al. |
| 7,083,658 B2 | 8/2006 | Andrus Jr. et al. |
| 7,094,264 B2 | 8/2006 | Steer |
| 7,132,183 B2 | 11/2006 | Galloway |
| 7,220,502 B2 | 5/2007 | Galloway |
| 7,272,934 B2 | 9/2007 | Chandran et al. |
| 7,276,148 B2 | 10/2007 | Plopski |
| 7,334,390 B2 | 2/2008 | Firey |
| 7,335,320 B2 | 2/2008 | Kindig et al. |
| 7,402,188 B2 | 7/2008 | Sprouse |
| 7,445,649 B2 | 11/2008 | Andrus, Jr. et al. |
| 7,452,392 B2 | 11/2008 | Nick et al. |
| 2002/0102195 A1 | 8/2002 | Lesieur et al. |
| 2003/0159354 A1 | 8/2003 | Edlund et al. |
| 2004/0107638 A1 | 6/2004 | Graham et al. |
| 2007/0160513 A1 | 7/2007 | Stell et al. |
| 2007/0266632 A1 | 11/2007 | Tsangaris et al. |
| 2009/0107046 A1* | 4/2009 | Leininger et al. ............ 48/86 R |
| 2009/0158663 A1* | 6/2009 | Deluga et al. ................ 48/209 |
| 2009/0206007 A1* | 8/2009 | Allam ......................... 208/415 |
| 2010/0083575 A1* | 4/2010 | Varadaraj et al. ............ 48/209 |
| 2010/0215565 A1* | 8/2010 | Schmidt et al. ........... 423/437.1 |

\* cited by examiner

| | | Typical Compositions of Common Feedstock | | | | | |
|---|---|---|---|---|---|---|---|
| | Pure Cellulose | Pine Wood | Kentucky Bluegrass | Feedlot manure | Refuse Derived Fuel | Primary Biosolids | Reed sedge peat | Bituminous Coal |
| Ultimate Analysis (wt%) | | | | | | | | |
| C | 44.44 | 51.8 | 45.8 | 35.1 | 41.2 | 43.75 | 52.8 | 69.0 |
| H | 6.22 | 6.3 | 5.9 | 5.3 | 5.5 | 6.24 | 5.45 | 5.4 |
| O | 49.34 | 41.3 | 29.6 | 33.2 | 38.7 | 19.35 | 31.24 | 14.3 |
| N | | 0.1 | 4.8 | 2.5 | 0.5 | 3.16 | 2.54 | 1.6 |
| S | | 0 | 0.4 | 0.4 | 0.2 | 0.97 | 0.23 | 1.0 |
| Ash | | 0.5 | 13.5 | 23.5 | 13.9 | 26.53 | 7.74 | 8.7 |
| C (maf) | 44.44 | 62.1 | 52.9 | 56.9 | 47.9 | 59.5 | 57.2 | 75.6 |
| Proximate Analysis (wt%) | | | | | | | | |
| Moisture | | 5-50 | 10-70 | 20-70 | 18.4 | 90-98 | 84.0 | 7.3 |
| Organics | | 99.5 | 86.5 | 76.5 | 86.1 | 73.47 | 92.26 | 91.3 |
| Ash | | 0.5 | 13.5 | 23.5 | 13.9 | 26.53 | 7.74 | 8.7 |

Fig. 5

GARBAGE IN POWER OUT (GIPO) THERMAL CONVERSION PROCESS

FIELD OF THE INVENTION

The present invention relates generally to gasification systems for generating electrical energy. More specifically, gasification systems and related methods are disclosed that accept a carbonaceous feedstock, such as municipal waste, and gasify the feedstock to generate electricity.

BACKGROUND OF THE INVENTION

Although gasifiers are a long standing technology, they have yet to seriously challenge our use of fossil fuels due to their inherent complicated nature with respect to the processing of feedstock. Because gasification is an inexact science, engineers have been unsuccessful to date in creating a process or product that can be turned over to an operator to be utilized as a predictable machine. Variations in feedstock, even within homogeneous species of feedstocks, yield varying results.

The existing art consists of several styles of gasifiers. Most are of the style that was originally constructed many decades ago in which a bed of feedstock is heated within a vessel, or stages within multiple vessels, where feedstock is subjected to heating at either atmospheric or raised pressure, and is in the presence of steam, oxygen, air, and/or some other gas to provide for a gasification reaction of the feedstock. The gasifier can be directly heated by combustion, which is most common, or indirectly heated by another source.

The original belt type or moving bed gasifier is still in use in some applications, where a dry feedstock is heated while a conveyor belt moves the feedstock through a heating zone. The feedstock breaks down over time, and ash is left over at the end of the machine. Synthetic Natural Gas (syngas) is released and captured within the reactor.

Up flow, down flow, and cross flow gasifiers consist of a large vessel in which the feedstock is carried through a reaction zone by gravity or by motive steam, air, or another fluidizing injection agent. These are typically more efficient, but again require dry feedstock.

Another major type of gasifier is the "tumbler" style gasifier, where a rotating drum rolls feedstock within it to expose the feedstock to a heating medium that is either entrained within, or is applied to the exterior of the tumbling tube. These gasifiers are not very applicable in large scale operations, and require the feedstock to dry out which leads to pyrolysis and gasification.

The last method is known as an entrained flow gasifier, where the feedstock is injected into a vessel, usually with steam or air, but which has also been entrained with hydrogen or inert gases. The flow is entrained with the fluidizing agent, and these are typically heated indirectly. The existing art includes entrained flow gasification where the feedstock is dried prior to entrainment.

Some styles include a devolatilization reactor preceding the gasifier which dries and extracts the light gaseous materials from the feedstock. This stabilizes the reaction by consuming the entrained oxygen prior to gasification to eliminate "run away" reactions where the feedstock material combines with the entrained oxygen and pyrolyzes and creates poor quality syngas.

All of these methods have a single major shortfall, which is that the controllability of their processes is subject to a fixed mechanical dimension, and the ability to change the operating characteristics of these gasifiers is limited by this.

Accordingly, there is an immediate need for improved gasification systems and related methods.

SUMMARY OF THE INVENTION

Various embodiments take existing gasification processes and advance them through two methods. The first is by using modular construction, and nearly infinitely variable process conditions to allow the process to be tuned during operation for the feedstocks encountered, be they either homogeneous or heterogeneous. The second is the use of a wet devolatilization reaction in lieu of a dry devolatilization reaction. This increases the efficiency of the process by eliminating the energy used to drive off water, and subsequently, the energy required to create steam for injection with the gasification process.

One aspect discloses a gasifier. The gasifier includes a plurality of heating channels, with each heating channel comprising a heating fluid metering device for metering the flow of a heating fluid through the respective heating channel. Insulated partitions may thermally separate the heating channels from each other. A plurality of gasifying circuits are each set within a respective heating channel or channels. Each gasifying circuit includes a feedstock metering device for metering the flow of feedstock through the respective gasifying circuit. A product gas outlet is fluidly connected to the plurality of gasifying circuits for outputting the product gas from the gasifier.

In certain embodiments the gasifying circuits are configurable by providing differing numbers of passes of the feedstock-carrying tubing through the heating channel. For example, some gasifying circuits may comprise two or more lengths of tubing disposed within the respective heating channel, in which the at least two lengths of tubing are connected to each other by an end piece. In specific embodiments the end piece comprises one or more sensors for collecting process data, such as the temperature, pressure or flow rate of the feedstock within the respective gasifying circuit. In preferred embodiments, each gasifying circuit comprises at one or more sensors for collecting process data for that respective gasifying circuit.

In various embodiments each feedstock metering device includes at least one of a block valve and a metering valve. In preferred embodiments the heating fluid metering device is an air damper.

In another aspect a devolatilization reactor is disclosed. The devolatilization reactor includes a pressurizable vessel body that is heated by a heating medium jacket. The heating medium jacket accepts a flow of a heating medium through the heating medium jacket and includes an inlet port for the heating medium and an outlet port for the heating medium. A feedstock entrance port is coupled to the pressurizable vessel body for introducing feedstock into the pressurizable vessel body. An auger assembly may be disposed within the pressurizable vessel body for mechanically moving feedstock within the vessel and for mechanically scrubbing the walls of the vessel to ensure that heat from the heating jacket adequately heats the feedstock. A separation column is coupled to the pressurizable vessel body for the exit of volatile gasses and processed feedstock from the vessel. The separation column includes a steam admission port for introducing steam into the separation column, a volatile scavenging port and a feedstock exit port. In preferred embodiments a column level sensor for sensing the height of feedstock within the separation column.

In preferred embodiments the pressurizable vessel body is designed to withstand pressures of up to 900 psi and temperatures of up to 600 degrees F.

The auger assembly preferably includes at least a gland seal that mechanically couples the auger to the pressurizable vessel body.

In yet another aspect, a method for processing a carbonaceous feedstock is disclosed. The feedstock is first used to create a feedstock slurry that comprises between 40% and 80% water. The feedstock slurry is devolatilized at between 300 and 900 psi and between 300 and 600 degrees F. for between 5 and 30 minutes to generate char slurry. The char slurry comprises char and between 40% and 80% water. The char slurry is gasified, using suitable pressures and temperatures, to generate a product gas, which is then supplied to a primary energy generator to generate power and an exhaust gas. The primary energy generator is preferably a fuel cell. The exhaust gas is used to indirectly heat the feedstock slurry and the char slurry during the devolatilization and gasification steps.

In preferred embodiments the exhaust gas is used to generate high temperature hot water that heats a devolatilization reactor used to devolatilize feedstock slurry. In such embodiments the exhaust gas also heats a gasification reactor used to gasify the char slurry. In certain embodiments a process air temperature booster may be used to boost the temperature of the exhaust gas before it is used to heat the gasifier. The process air temperature booster may combust the product gas to heat the exhaust gas.

In other preferred embodiments heat is scavenged from the product gas and used to pre-heat the feedstock slurry prior to devolatilizing the feedstock slurry.

These and other aspects and advantages will become more apparent in the following detailed description.

BRIEF DESCRIPTION OF THE DRAWINGS

FIG. 5 is a table that indicates the typical compositions of common feedstock materials.

DETAILED DESCRIPTION

In the following, the term "feedstock" generally means any energy-bearing material that may be fed into a system for processing purposes. Hence, the output of one system may serve as the feedstock input material for another system.

The GIPO thermal conversion process may process any type of carbonaceous feedstock, utilizing similarly physically designed reactor systems for any given feedstock. The systems are modular such that they can be tuned in terms of capacity and reaction parameters.

Figure 1:
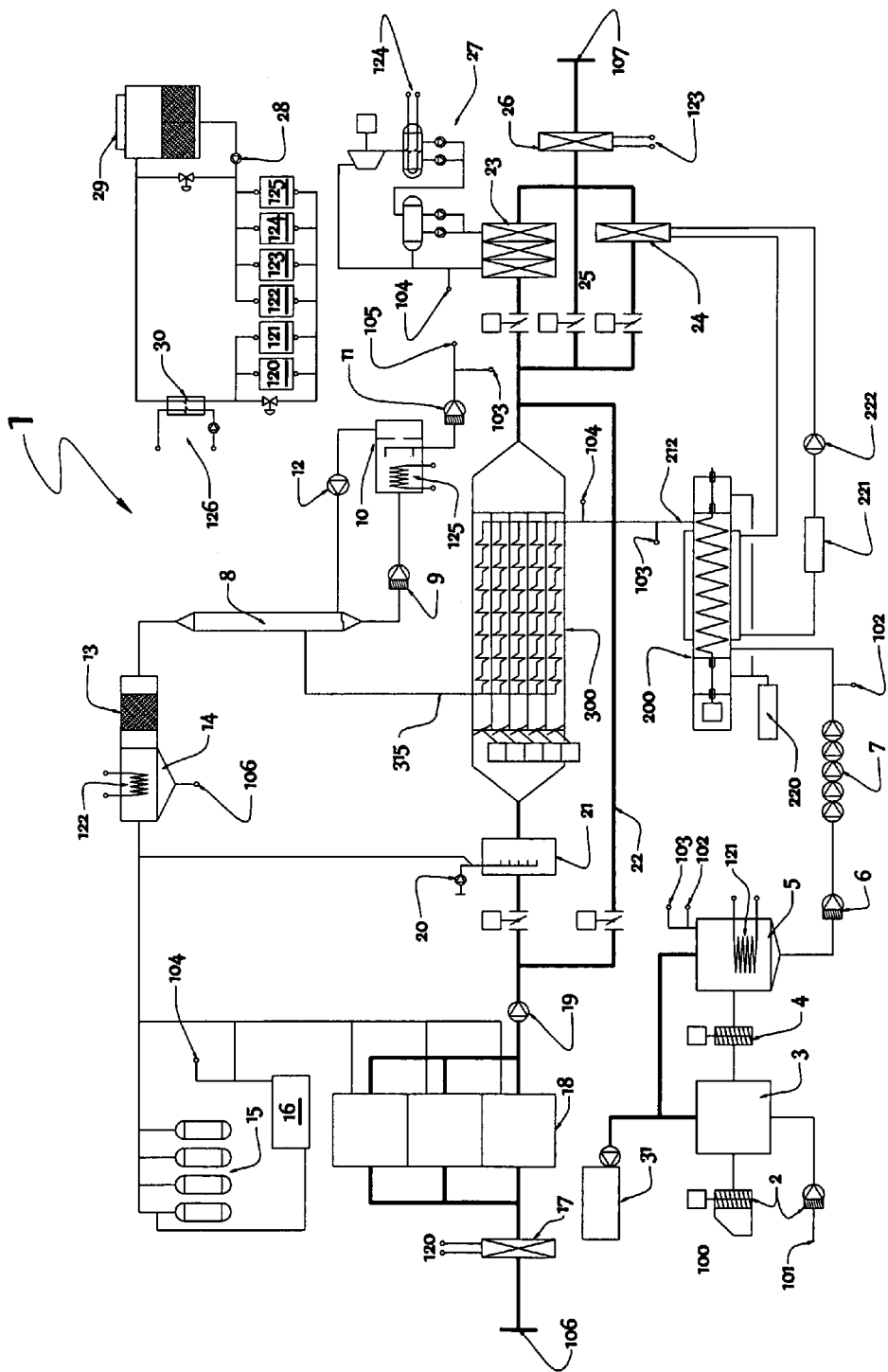
FIG. 1 illustrates preferred embodiment systems installed within a larger plant including auxiliaries.

A preferred embodiment power plant 1 is illustrated in FIG. 1. FIG. 1 illustrates preferred embodiments of certain aspects of the invention installed within the larger plant 1, including auxiliaries. The preferred embodiment power plant 1 utilizes fuel cells as the primary energy generator 18. The plant 1 may provide both power generation and waste disposal. Other embodiment plants, such as a plant for the production of district natural gas, may be configured differently. Other example plants, which may utilize the natural gas for mechanical power generation for use in a third party process, may utilize yet another configuration.

One aspect of gasification is the ability to introduce feed stocks to a reaction vessel or vessels 300, where the feedstock entering the reaction vessels is substantially pulverized, contains a minimal amount of entrained volatiles, and has good contact with the fluidizing agent, the hydrogenating agent, and the heat required to thermally convert the materials from the complex carbon constituents into simple carbon constituents that can be used as synthetic natural gas (syngas). The embodiment plant 1 focuses on the generation of synthetic natural gas, with a concentration on methane. Generation of hydrogen is possible, but may be less attractive considering its low heating value compared to a carbon-based natural gas.

The GIPO thermal conversion process attains all of the above parameters by, among other aspects, the method in which the feedstock is devolatilized in the primary reactor 200 and injected into the secondary reactor 300. The feedstock that is fed into the primary reactor 200 comprises a ground slurry, which preferably contains between 40% and 80% water, with a preferred typical water concentration of roughly 60%.

The plant 1 major components include feedstock handling equipment, which may include primary grinders 2 for garbage acceptance and sewage; a primary storage tank 3; secondary grinders 4; a secondary storage tank 5, which may include tank heating coils 121; a fine grinder pump 6, and a main pressure pump 7. In addition, the plant 1 also includes one or more of the primary reactors 200 and one or more of the secondary reactors 300, the primary energy generator 18 (which, as discussed above, is a fuel cell for preferred embodiments), cooling and economizer systems, and other plant auxiliaries.

The cooling and economizer systems may include a process air pre-heater 17, a high pressure steam generator 23, a secondary process air bypass circuit 25, a high temperature hot water generator 24, a discharge air cooler 26, a packaged steam power generation system 27, a low temperature cooling water (LTCW) pump or pumps 28, a cogeneration heat exchanger 30 and a cooling tower 29.

The other plant auxiliaries may include, for example, odor control system 31, ash/slag slurry return grinder pump 9, ash/slag slurry separator and cooler 10, primary separator water supply pump 12, ash/slag slurry removal grinder pump 11, screening and filtering 13, syngas cooler 14, gas storage 15, startup steam boiler 16, process air temperature booster burner 20, process air temperature booster assembly 21, and primary process air bypass circuit 22.

The acceptance of feedstock of municipal garbage 100 and sewage 101 may enter in through primary grinders 2, and be deposited in one or more primary holding tanks 3. Feedstock may also include dedicated waste handling systems such as farm waste, food processing waste, etc. Feedstock can be sourced from any number of carbon-based materials. Embodiment plants 1 may be constructed to accept any combination of these feedstock streams.

The feedstock may be coarsely ground in the primary grinders 101, 2 to provide solids which have a substantially reduced major dimension than the raw feedstock delivered to the plant 1. The feedstock leaving the primary grinders 2 may be ground to a coarse fineness, where solids will have, for example, a major dimension below 3 inches. An acceptable range of sizes for primary grinders is, for example, between 1 inch and 6 inches. Grinders in this capacity may be constructed in the manner consistent with any suitable grinder known in the field. In preferred embodiments, the primary tanks 3 feed directly into one or more secondary holding tanks 5 through one or more secondary grinders 4. The feedstock leaving the secondary grinders 4 may be ground to a medium fineness, where the solids will have, for example, a major dimension well below 1 inch. An acceptable range of sizes is, for example, between 0.050" and 1.000".

The secondary holding tanks 5, primary holding tanks 3, or both, may be fitted with the odor control system 31 which may draw a slight vacuum on one or both of the primary 3 and secondary 5 holding tank systems and substantially prevent escape of odorous gasses. The secondary holding tanks 5 may also be fitted with a heating apparatus 121 to provide a primary level of heat extracted from waste heat off of the main process. The cooling system is described later, and is the source of the heat for this heating apparatus 121.

The feedstock is then drawn from the secondary storage tanks 5 by one or more final grinder pumps 6. This pump 6 draws feedstock slurry from the secondary tanks 5 and finely grinds the material while delivering it to one or more main pressure pumps 7. Feedstock leaving the final grinder pump preferably will have a major dimension of not more than 0.25", with, for example, a range of between 0.005" and 0.25". The grinder pumps 6 are any suitable unit known in the field for the duty indicated. The main pressure pumps 7 bring the finely ground feedstock from the delivered pressure of the final grinder pump 6 to the operating pressure of the primary reactor 200. Main pressure pump 7 is a unit suitable for the duty described, of which several construction types are known in the field. Multi-stage piston or progressive cavity pumping units could perform this duty, for example. The main pressure pump 7 may be fitted with a recycle line 102, leading back to secondary storage 5.

The arrangement of primary/secondary storage and grinder systems may be modified to add or remove stages as necessary for particularly difficult feedstocks, or for feedstocks which are delivered in a primarily pulverized state. For example, usage of especially difficult materials, such as bulk rubber, may require additional stages of pulverization, whereas more-ready materials, such as livestock manure, which is already in a slurry state, may require fewer grinder stages.

The slurry is at a high pressure when delivered from the main pressure pump 7. In preferred embodiments the slurry is at between 500 and 900 psia when it enters the primary reactor 200. The pressure at which the vessel 200 operates is preferably such that the water in the slurry will not flash to steam while heated.

The embodiment primary reactor 200 provides the first stage of feedstock thermal treatment. At high pressure, between 300 and 900 psi, and medium temperature, between 300 and 600 degrees F., the feedstock is devolatilized. The embodied plant 1 may treat the feedstock in the primary reactor at between 400 and 500 degrees F., at just above the treatment temperature's steam saturation pressure. The feedstock has a long residency time within the primary reactor 200, where the elevated temperatures and high pressure basically cook the material which releases simple gaseous constituents having simple hydrocarbons and other gaseous compounds and elements in a process known as devolatilization. Residency time within the devolatilization reactor may be between 5 and 30 minutes. Devolatilization entails the release of volatile constituents of the feedstock such as oxygen, and lighter and more easily released simple hydrocarbons.

Figure 2:
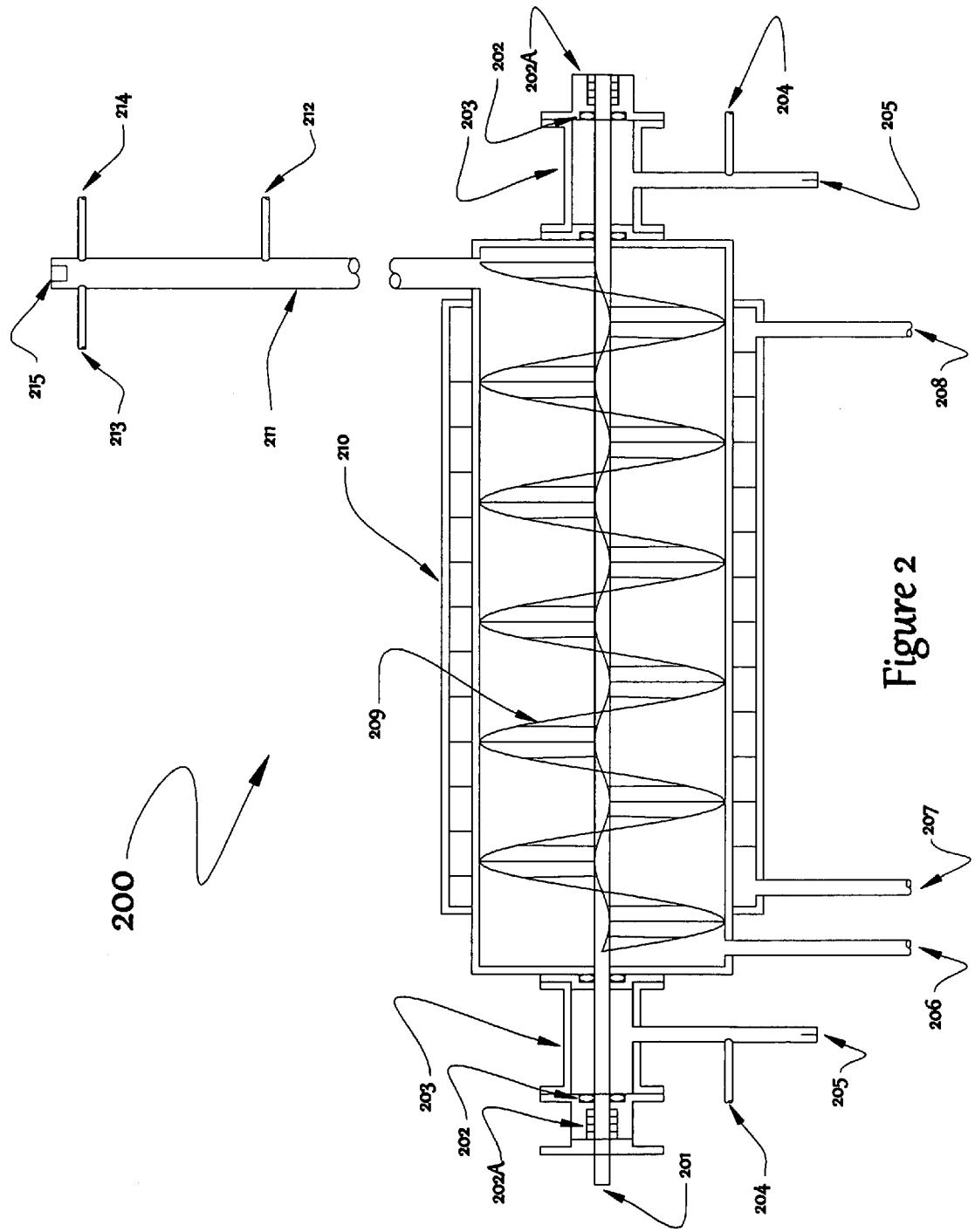
FIG. 2 illustrates the physical layout of an embodiment devolatilization reactor.

FIG. 2 illustrates a more detailed view of the embodiment devolatilization reactor 200. The feedstock enters through feedstock entrance port 206 and takes residence inside the vessel 200. The vessel 200 is heated by a heating medium jacket 210 which accepts and rejects heating fluid through high temperature hot water inlet port 208 and outlet port 207. The vessel 200 may be fitted with a mechanical auger assembly 209, which provides for interior wall scrubbing through mechanical means. The wall scrubbing maintains the heat transfer qualities of the reactor 200 at an efficient level. Due to the high operating pressure, the devolatilization reactor 200 is preferably fitted with gland seals 203 at either end where the auger assembly 209 penetrates the vessel walls. These seals 203 may be charged with dry nitrogen 220 to provide a clean barrier between the inner seals 203 and outer seals 202, and keep the bearings 202A from operating at the same temperatures, pressures, etc. as the secondary reactor internal processes. This also allows the bearings 202A to be serviceable without entering the vessel 200. The seal gaps may also be fitted with leak detection equipment 205 to notify operating personnel if and when the inner seals 203 have worn substantially enough to start leaking and require servicing.

The feedstock leaves the vessel 200 and enters the separation column 211. The column 211 introduces a vertical elevation head and is pressurized with steam, which is admitted through steam admission port 213. The resultant steam blanket limits the height that the feedstock material reaches by operating off of a column level sensor 215 while allowing the volatiles to escape. By way of example, the column level sensor 215 in the preferred embodiment may be an ultrasonic level sensor of any suitable construction known in the field. The usage of the steam blanket and vertical column introduces a height-head based pressure control on the outlet of the reactor 200. At the base of the column, the feedstock enters at the vessel reaction pressure. The vertical column of feedstock produces a height-head on the base of the column, allowing the pressure in the vessel to be maintained, while the top of the column approaches the saturation pressure of water. At the top of the column, there may be a wet feedstock/steam interface which introduces a steam blanket pressure to the top of the column. The steam blanket pressure, plus the vertical height-head of the column accounts for the full pressurization of the devolatilization reactor. The steam blanket allows for the height in this column to be maintained by administering more or less steam to the column. This is because the height of the column is directly related to the pressure of the blanket steam. Having a steam blanket also allows volatile gasses to escape from the feedstock, up through the steam blanket, and out through the volatile scavenging port 214. The volatiles are liberated from the feedstock and are allowed to pass through the steam blanket as they reach the volatile scavenging port 214. This port 214 leads the volatiles to a separate circuit within the secondary reactor 300 to be treated and reformed for use as fuel. These gases may be introduced separately to the secondary reactor 300 in order to utilize the steam reforming capacity to mitigate harmful or ecologically damaging gases such as hydrogen sulfide. The devolatilized feedstock leaves the separating column through port 212.

The feedstock slurry has been substantially converted to char slurry at port 212. Char includes more complex carbon based constituents in solid or liquid form substantially devoid of volatile materials that requires further processing to break down the final carbon bonds and produce synthetic natural gas.

FIG. 1 illustrates that in the embodiment plant 1 the feedstock leaves the primary reactor 200 and enters the secondary reactor 300. The feedstock may be routed back to the secondary holding tank 5 in a recycle mode 103. Steam may be admitted to the feedstock from the steam header 104.

Figure 3:
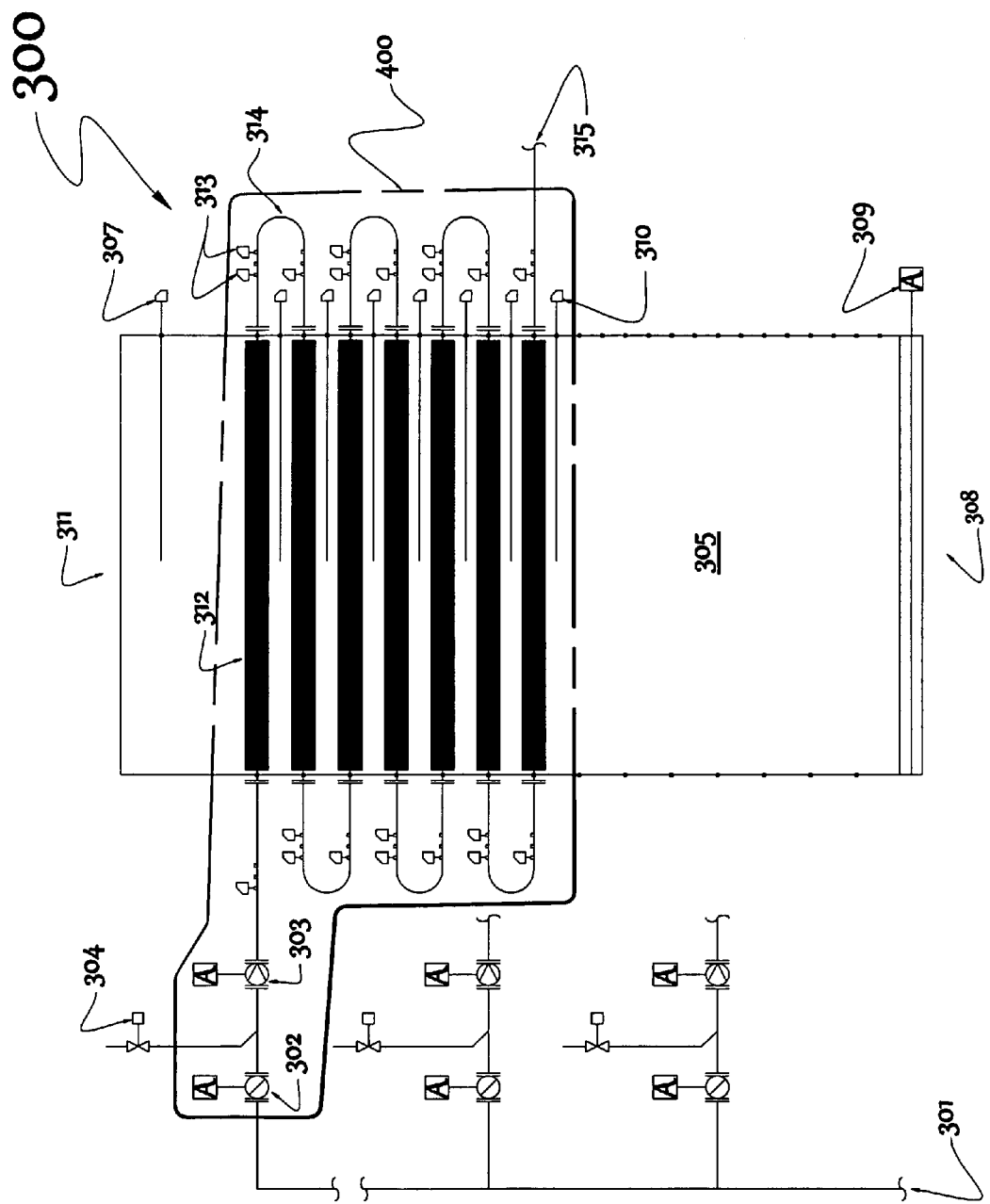
FIG. 3 illustrates a feedstock admission system as well as a single circuit of an embodiment secondary reactor.
Figure 4:
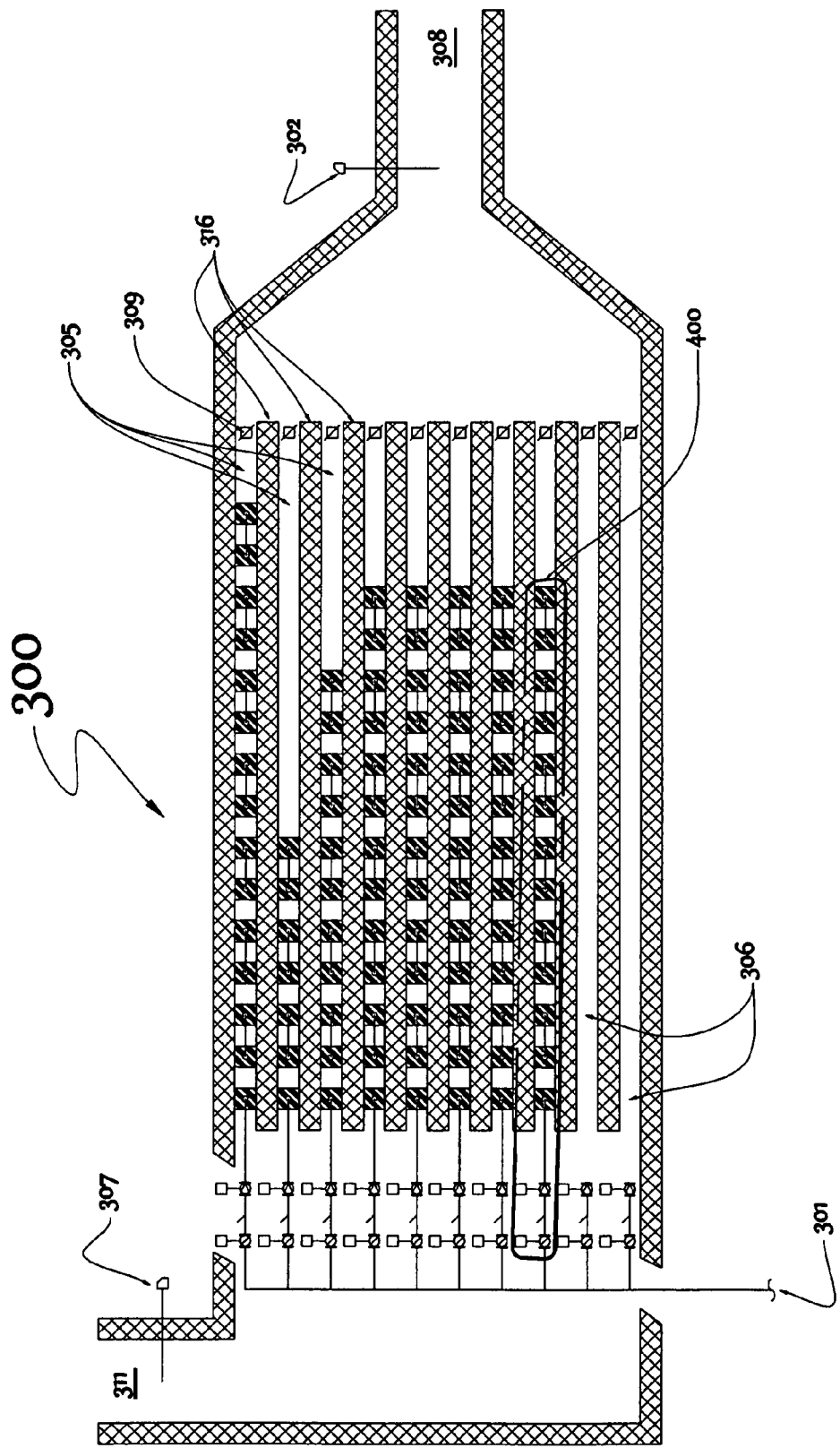
FIG. 4 is another view illustrating the modular, stacked nature of an embodiment secondary reactor.

FIGS. 3 and 4 illustrate the embodiment secondary reactor 300 in two views. FIG. 3 is a plan view of the secondary reactor 300, and FIG. 4 illustrates a section or elevation view of the embodiment secondary reactor 300.

In the embodiment reactor 300, the feedstock enters the secondary reactor 300 through one or more inlet feed piping train 301 where it may be routed through a plurality of circuits 400. Each circuit 400 has a modular construction, such that additional lengths of tubing 312, 314 may be added in order to tune the specific circuit 400 to meet the needs of the feedstock gasification. The gasification reactor 300 is indirectly heated, meaning that the entrained flow gasification occurs within the tube 312, while heat is applied to the exterior of the tube 312.

The front end of each circuit 400 may be substantially similar, and each is fitted with a block valve 302, a metering admission valve 303 and a control valve 304 for steam and/or hot water to be administered to the process flow through the circuit 400.

FIG. 3 illustrates one complete circuit 400 in plan schematic view. These plan schematic views are stacked, one on top of the other, such that the elevation view of the embodiment reactor 300 appears similarly to FIG. 4.

As the slurry is admitted to the secondary reactor 300, it passes through a metering device 303, which can control the flow rate into a specific circuit 400 of the reactor 300. This is preferably a control valve rather than a fixed orifice, which desirably provides an aspect of process control. As the slurry passes through the metering device 303 of the respective circuit 400, a portion of the water will flash to steam. As it flashes, it becomes both a pulverizing force and a motive fluidizing agent which carries the feedstock through the reactor 300. It is also the significant heat transfer medium between the walls of the indirectly heated gasifier 300 and the feedstock material itself. It is also the hydrogenating fluid, as the temperature at which the gasification occurs is within the region where the water-gas shift occurs.

Each circuit 400 may comprise several straight sections 312 which may or may not be mechanically enhanced. For example, the lengths shown in FIG. 3 are indicated to be mechanically enhanced using fins on the exterior of the tube 312. The outlet of a tube 312 may be joined to additional lengths of tubing 312. If the circuit 400 is continued, then each length of tubing 312 is fitted with an end piece 314 which turns the flow 180 degrees to make another pass through the embodiment secondary reactor 300. At the entrance of each circuit 400, and at each of these end pieces 314, one or more sensor pockets 313, or wells, may be fitted in the circuit 400 that allows the process control to obtain telemetry readings from the process flow throughout the passes in a circuit 400. These pockets are indicated in FIG. 3 as being partially populated with circuit segment lengths 312. These sensors 313 may measure any type of telemetry available for process control including, but not limited to, temperature, pressure, mass or volumetric flow, density, sample gathering, etc.

The fittings installed in the circuits to allow telemetry readings may be of any suitable construction known in the field. For example, sensor wells may be welded into the circuit conduit constructed of the same material as the circuit material in which a temperature sensor may be installed. Another example may include a well adapted to allow pressure to be transmitted through a port, or through a piston pressure sensing device of a construction known in the field. Another example may include a port which allows a portion of the contents of the circuit to pass out of the circuit to a sampling device. Another example may include a venturi installed within the circuit of the pipe, or an orifice installed in the piping to allow for volumetric or mass flow metering in a method known in the field. Yet another example may include a special spool piece installed within the circuit that is adapted to allow a sensor to be installed to measure the density or flow rate through ultrasonic or microwave sensing methods in a manner known in the field.

In the embodiment secondary reactor 300, the circuits 400 are heated externally by a medium such as air, passing through an independently metered channel 305 for each circuit 400. The heating medium is a fluid, and most preferably a gaseous fluid, which has been previously heated by any one or combination of a multitude of sources. The primary source of heat is preferably the primary energy generator 18. The heating medium enters the reactor 300 at, for example, process air inlet 308 through a metering device 309 which is capable of volumetric control over the fluid. The metering device 309 is an air damper in the shown preferred embodiment 300. FIG. 4 shows the alternate view of the heating medium channel 308 where the heating medium may pass through the metering assembly 309, enter a respective channel 305 around the corresponding circuit 400, which is separated from the next circuit channel 305 by an insulated partition 316. The heating medium side of the circuit 400 may also be fitted with provisions for telemetry 310 to feed back to the control system as it enters, and after each pass over a circuit length 312. This allows for the heating medium to be monitored for heat transfer feedback to the operator.

Heating medium channels 305 may or may not be populated by a circuit 400 at any point during operation, and each circuit 400 may be of a different length. As shown in FIG. 4, some channels 305 may not be populated, as indicated by 306, while the remaining channels 305 illustrate varying numbers of circuit lengths as provided by corresponding end pieces 314. These non-populated channels 306 may be used for bypass flow if and when needed.

Control aspects may include the metering of flow rate and temperature of the heating fluid. In the embodiment secondary reactor 300 each circuit 400 is provided with a corresponding metering assembly 309 which controls the flow rate of fluid over the exterior of the respective gasification circuit 400. The embodiment control scheme may also allow for the temperature control of this fluid stream, by adding or subtracting heat through a multitude of means. It is anticipated that the heating medium will operate between 1800 degrees F. and 2500 degrees F.

The secondary reactor inlet 308 may also be provided with control telemetry 302. In preferred embodiments the overall heating medium conditions are measured for temperature, pressure, and/or other telemetric parameters in order to control the treatment of the heating medium upstream of the secondary reactor 300. This may again be the case for the outlet telemetry 307. The heating medium collects after passing through each channel 305, and leaves the reactor 300 at the process air outlet 311.

It has been shown that the pressure at which gasification occurs has an effect on the outcome. As such, each gasifier circuit 400 may be fitted with an exit pressure control device (not shown), which would allow the gasifier 300 to be optimized with respect to the pressure, which could be as low as a vacuum pressure, in the case of a vacuum condenser on the outlet 315 of the gasifier 300 and no throttling on the exit, or could be nearly as high as the devolatilization reactor 200 pressure. It is anticipated that a majority of the feedstock varieties will operate at roughly 150 psia through the gasifier 300. This pressure control device may be fitted, for example, to the secondary reactor circuit outlet 315 or to the gas outlet of the primary separator 8. In certain embodiments each circuit 400 may have its own respective gas outlet valve, whereas in other embodiments all circuits 400 may share a single gas outlet valve. Intermediate combinations are also possible.

In the embodiment plant 1, the individual circuits 400 in the secondary reactor 300 are combined as they enter the primary separator 8. The separator 8 may be of standard construction known in the field, and may feature a water bath at the base, where particulates such as ash are collected. This bath leads to the ash handling system. The ash handling system is comprised of the slurry pump 9 which is a grinder pump suitably selected from those known in the field, which discharges into the separation tank 10. The separation tank 10 features a cooling coil 125 which cools the ash quenching water, and is of a construction suitable of that known in the field. The first section of the separation tank 10 collects solids, and another grinder pump 11 extracts the more concentrated ash slurry and pumps it to either the secondary storage tank 5 through recycle mode circuit 103 or out to ash transport through circuit 105. Ash transport may be, for example, a truck that takes the slurry mixture to a material recycler. The ash clean water recycle pump 12 draws off of the settling tank 10 and returns the water to the bath in the primary separator 8. All of the grinder pumps and regular pumps may be of standard construction, as known in the field.

In the primary separator 8 the thermally converted synthetic natural gas is separated from any entrained ash or slag that is unwanted further in the process. Under normal conditions, slag is not formed within the gasification reactor 400, but under abnormal operating conditions, slag may be formed. To further separate the fine particulates, the gas may be passed through a screening filter 13 and a final aftercooler 14. Cooling is provided through a cooling coil 122 and the condensate from the steam is drained through circuit 106. The gas treatment by the filters 13 and aftercoolers 14 may be of standard construction as known in the field.

The synthetic natural gas leaves the final aftercooler 14 and may be routed, for example, to gas storage 15, the auxiliary boiler 16, the primary energy generator 18, the booster heater burner 21 or combinations thereof. The primary energy generator 18 is preferably a molten carbonate fuel cell (MCFC), known as a "Direct Fuel Cell," as known in the field. Another primary energy generator may be a Solid Oxide Fuel Cell (SOFC), known as a high-temperature fuel cell, as known in the field. These types of fuel cells may require that the natural gas is entrained in steam in order to operate according to their own internal reforming techniques. During normal operation, the final aftercooler 14 is tuned to reduce some of the steam entrainment, but not all, because of the fuel cell 18 requirements, in a manner consistent to that known in the field. During cold startup, or when otherwise drawing from natural gas storage 15, the gas may be required to be entrained with a secondary source of steam. The auxiliary boiler 16 provides steam to the natural gas line when needed to provide the adequate amount of steam to the fuel cells 18 during startup, and the steam header 104 is able to supply the steam when operating normally.

The primary energy generator 18 may also be embodied in other commercially available generation sources known in the field such as reciprocating engines, gas turbines, boilers, etc. The prime energy generator 18 is the plant 1 core that provides the conversion of fuel to electricity, while producing heat to drive the remainder of the processes. This is known in the industry as Integrated Combined Cycle. Usage of conventional "burning" equipment may require the removal of all steam from the syngas in order to eliminate efficiency losses from the entrained water mass. Also, using conventional "burning" equipment does nothing to contain the fuel side of the cycle. One objective of the plant 1 is to contain any harmful waste materials within the plant 1 to suitably recycle them. NOx and SOx emissions are nearly non-existent with fuel cells, but would be present in any type of conventional equipment. This is not to say that a plant 1 cannot operate with these as the primary energy generators 18, but it may come at an efficiency and ecological loss when compared to fuel cells.

The booster heater burner 20 and assembly 21 provides a temperature elevation when needed. The need may be dictated by the temperature inlet requirement of the secondary reactor 300 controls.

The control system for the plant 1 process may be one that feeds back as much information to the operator to allow adjustments to be made "on the fly" to change process conditions as the feedstock conditions change. With acquisition and processing of trend data, automated control logic may be used to control operations of the plant 1. Alternatively, manual operation may be provided with loop controllers for individual control points, and operation of these loop set points may be reliant upon an operator.

The operation of the plant may be through a process control system which may relay the current operating conditions with respect to temperature, pressure, mass or volumetric flow rates, current valve and damper positions, current motor speeds, flow densities, etc. back to a human operator. Simple loop controllers known in the field may provide elemental controls, or may be integrated in a customizable logic scheme through programmable logic controllers known in the field. For example, there may be a loop controller installed to control the feedstock inlet metering valve 303 for a circuit based on the circuit outlet 315 density of that circuit. Also by example, a temperature loop controller may be installed that references the temperature at certain points 313 within the gasifier circuit 400 that may control the inlet damper to the heating medium channel of the corresponding circuit. Also by example, there may be a loop controller installed to control the pressure of the reaction circuits 400 based upon the outlet gas composition from a suitable mass spectrometer unit known in the field. The operator may adjust the existing condition set points, positions, loop control parameters, etc. in order to tune the reaction to the desirable result. These current operating conditions may be trended within the programmable logic controller using any suitable method known in the field during the operation of the plant to provide reaction curves which will eventually lead to more complex automation programming.

The quantity of telemetry points may be based on the individual circuit 400 modular construction, and may be able to be changed as the plant 1 conditions change. Preferred embodiment plants 1 include the facility of these two primary reactors 200, 300 to be integrated with such expansive telemetry and control system. The control system may be commercially sourced from existing controls manufacturers known in the field.

The process air path, or heating medium path, starts at the outside air intake 106 where outside air is brought into the system 1. An economizer coil 17 may provide some low-level temperature rise to save energy from the waste heat portions of cycle 120. The waste heat may be sourced from the cooling system, described later. After passing through the economizer 17, the air is admitted to the primary energy generator 18 to react with the synthetic natural gas. The primary energy generator 18 converts the fuel into both power and heat. Electrical power is sent to the plant electrical systems while mechanical power, if any, may be utilized at the plant. The heat created is carried by the process air as it leaves the primary energy generator 18, and is driven through the remainder of the process by the process air booster fan 19. The air is now either admitted to the secondary reactor 300 or bypassed via bypass 22.

The bypass 22 rejoins the main process air path downstream of the secondary reactor 300, where, in the embodiment plant 1, a second set of heat exchangers exists. One path the process air may be admitted is the heat recovery steam generator (HRSG) 23. This HRSG 23 may create medium pressure to high pressure steam between 60 and 900 psia. In the embodiment plant 1, the steam is preferably generated at 250 psia, and may be superheated to drive, for example, a steam system including a steam turbine generator 27. A portion of the HRSG may be devoted to high pressure steam service for the primary reactor 300 separation column 211. The HRSG 23 and steam plant components may be of conventional construction as known in the field. Another path for the process air may be to the primary reactor high temperature hot water (HTHW) heating coil 24. This coil 24 provides the heat transfer from the process air to the HTHW loop that serves the primary reactor 200. The HTHW system may employ a pump 222 and balance of plant including air separation, expansion tanks, and makeup water connections 221. All components of the HTHW system including pumps 222, heat exchange coils 24, and related appurtenances 221 are known in the field. This second set of heat exchangers 23, 24 also may have a bypass 25 which allows process air to pass without transferring heat to these two systems.

The process air then passes through a final economizer coil 26 before being exhausted 107. The economizer coil 26 in the embodiment plant 1 is a standard air to water coil known in the field.

The cooling and economizer system may include a water loop containing the cooling water pump 28, the cooling tower 29, and various connections to the systems. The water pump 28 and cooling tower 29 may be of standard construction known in the field. Heat is absorbed by the system at the syngas cooler 122, the process air outlet stream 123, the steam turbine condenser 124, and the ash slurry cooler 125. Heat is economically salvaged by admitting it back to the process in the outside air preheater 120 and in the secondary storage tank heating apparatus 121. Further waste heat may be reused through the heat exchangers 30 to provide for third party heating 126. All of the equipment in the cooling system may be of standard construction known in the field.

The GIPO Thermal Conversion Process

The driver behind the thermo-chemical conversion is the desire to produce high quality synthetic natural gas using a widely varied feedstock. Carbon based feedstocks are typically around 47-50% carbon, 5% hydrogen, 38% oxygen, and the remainder in other elemental minerals as illustrated in FIG. 5. Of this amount, about 0.5% is nitrogen (3% in municipal wastewater), and about 0.4% is sulfur. One objective is to extract the carbon in the form of $CH_4$ instead of the less useable CO, and completely unusable $CO_2$. The process preferably occurs in two distinct steps to provide gas that can be cooled to produce the quality required for the remainder of the process. FIG. 4 presents a table indicating the typical compositions of common feedstock materials.

The first step of the reaction is to liberate the entrained oxygen and volatile light hydrocarbons. This action is desirable in order to control the reaction in the second stage more closely. Separating oxygen ensures that the feedstock reactant temperatures will not "run away" in the second reactor, and will not generate excessive $CO_2$ which occurs when free oxygen reacts with the bulk of the carbon material. By liberating the already light hydrocarbons, the heat required in the second reaction is lower, due to the fact that most of the materials are already in useable form. Although most of the released material will be in the form of oxygen and easily released light hydrocarbons, other released materials are mineral-gas constituents such as hydrogen sulfide, which will be a part of feedstock derived from municipal wastewater.

The primary reactor 200, i.e., the devolatilization reactor 200, accomplishes this and allows the released volatiles to be treated, for example, in the second stage 300 in a separate circuit 400. This is accomplished at high pressure, 500 to 900 psia, and medium temperature, 300 to 500 degrees F., in the first reaction vessel 200 to liberate the volatile components of the feedstock. Keeping the feedstock at the critical water phase changing temperature allows the localized release of entrained gasses without wasting the heat energy of drying out the material to accomplish this. The gasses are to be scavenged later in the reactor 200. Separate treatment of the released gases in the secondary reactor 300 may allow for the reaction to be controlled independently, and thereby allow all entrained hydrocarbons to be reformed into useable fuel, and to reform other components, such as hydrogen sulfide, into elemental sulfur and hydrogen gas. All elementally reformed materials are collected in primary separator 8, and subsequently gathered in ash handling system 9, 10, 125, 105.

After this treatment, the feedstock leaving the primary reactor 200, mostly devoid of oxygen, is ready to enter the secondary reactor 300. The feedstock, at this point, has been converted to a char material, or simplified hydrocarbons that comprise mostly carbon.

The main driver behind the requirement for low oxygen content is the reformation for useable synthetic natural gas. According to the tables in Chemical Equilibria in Carbon-Hydrogen-Oxygen Systems, feedstocks with a hydrogen to oxygen ratio of at least 2:1, and at lower equilibrium temperatures produce gases of higher methane content. Tables under the Carbon-Hydrogen-Oxygen System, with an H/O ratio of 2.0 show high methane content in the 750 degrees F. range at elevated pressures. At the outlet of the primary reactor 200, at approximately 500 degrees F. and 60 bar, any liberated gas will be roughly 20% methane, 61% water vapor, and 20% carbon dioxide. This yields a 50% $CH_4$ concentration for dry gas, which is ideal for the fuel cells 18 to be utilized in the process.

| Carbon-Hydrogen-Oxygen System, Constituents by MOL | | | | | | | |
|---|---|---|---|---|---|---|---|
| H/O Ratio | Temp (F.) | Press (bar) | $H_2$ | $H_2O$ | $CH_4$ | CO | $CO_2$ |
| 1.0 | 500 | 10 | 0.0029 | 0.5249 | 0.0688 | 0.000 | 0.4031 |
|  |  | 20 | 0.0020 | 0.5257 | 0.0690 | 0.000 | 0.4031 |
|  |  | 50 | 0.0013 | 0.5263 | 0.0292 | 0.000 | 0.4030 |
| 1.0 | 750 | 10 | 0.0231 | 0.4581 | 0.0885 | 0.0017 | 0.4284 |
|  |  | 20 | 0.0165 | 0.4632 | 0.0904 | 0.0012 | 0.4284 |
| 2.0 | 500 | 10 | 0.0049 | 0.6086 | 0.1919 | 0.000 | 0.1944 |
|  |  | 20 | 0.0034 | 0.6095 | 0.1926 | 0.000 | 0.1943 |
|  |  | 50 | 0.0022 | 0.6103 | 0.1931 | 0.000 | 0.1942 |
| 2.0 | 750 | 10 | 0.0359 | 0.5202 | 0.2126 | 0.0012 | 0.2299 |
|  |  | 20 | 0.0256 | 0.5260 | 0.2174 | 0.0009 | 0.2298 |
| 2.0 | 1000 | 10 | 0.1267 | 0.4222 | 0.1891 | 0.0185 | 0.2432 |
|  |  | 20 | 0.0934 | 0.4422 | 0.2054 | 0.0131 | 0.2456 |
| 2.0 | 1250 | 10 | 0.2716 | 0.2833 | 0.1269 | 0.1104 | 0.2075 |
|  |  | 20 | 0.2133 | 0.3261 | 0.1566 | 0.0809 | 0.2228 |
|  | 1500 | 10 | 0.3944 | 0.1287 | 0.0622 | 0.3102 | 0.1043 |
|  | 1750 | 10 | 0.4541 | 0.0396 | 0.0263 | 0.4529 | 0.0269 |
|  | 2000 | 10 | 0.4794 | 0.0117 | 0.0117 | 0.4910 | 0.0059 |
| 3.0 | 750 | 10 | 0.0437 | 0.4977 | 0.3158 | 0.0010 | 0.1416 |
|  | 1000 | 10 | 0.1518 | 0.4055 | 0.2712 | 0.0148 | 0.1564 |
|  | 1250 | 10 | 0.3223 | 0.2727 | 0.1788 | 0.0895 | 0.1364 |
|  | 1500 | 10 | 0.4685 | 0.1238 | 0.0878 | 0.2512 | 0.0684 |

The driver behind the higher temperatures is the fact that the complex bonds in the feedstock must be broken. To accomplish this, the devolatilized feedstock is admitted to the reactor 300 and brought to much higher temperatures than may be desirable for synthetic natural gas equilibrium. Most bonds are fully broken when feedstocks reach temperatures above 1500 degrees F., and the secondary reactor 300 is capable of bringing feedstock to temperatures upwards of 2000 degrees F. in order to tune the process to the desired feedstock conditions. An objective is to vary the temperature of reaction to obtain carbon chain breakdown, without pushing the temperature into the range where the quality of the syngas is degraded.

When the secondary reactions are held at 1500 degrees F., and at a pressure of roughly 10 bar, the gas will most likely comprise about 40% CO, 45% $H_2$, 10% $CH_4$, 4% water vapor, and 3% $CO_2$. It is anticipated that this gas will be held at this pressure in the aftercooler 14 at a temperature of roughly 500 degrees F. in order to reform the gas into the useable concentrations mentioned previously before dropping the pressure and cooling the gas to the useable temperature of about 300 degrees F. for admission to the fuel cells 18. A throttling valve on the outlet of the primary separator 8 may provide for this residency time. Injection of hydrogen into the aftercooler 14 may produce even higher concentrations of methane. An additional 10% methane may be realized if hydrogen injection is provided.

All publications cited in the specification, both patent publications and non-patent publications, are indicative of the level of skill of those skilled in the art to which this invention pertains. All these publications are herein fully incorporated by reference to the same extent as if each individual publication were specifically and individually indicated as being incorporated by reference.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A method for processing a carbonaceous feedstock, the method comprising the steps of:
    (a) providing a carbonaceous feedstock;
    (b) preparing a feedstock slurry from said carbonaceous feedstock, wherein said feedstock slurry comprises between 40% and 80% water;
    (c) optionally pre-heating said feedstock slurry prior to devolatilizing;
    (d) devolatilizing said feedstock slurry at a pressure between 300 and 900 psia such that the water in the slurry does not flash to steam while heating at a temperature between 300 and 600 degrees F. for between 5 and 30 minutes, to generate a char slurry comprising char and between 40% and 80% water;
    (e) introducing a pressure decrease in the flow of said char slurry from the devolatilization step to the gasification step, such that at least a portion of the water flashes to steam to produce a steam char slurry;
    (f) subjecting said steam char slurry to gasification at a temperature between 1500 and 2000 degrees Fahrenheit, to generate a product gas comprising methane;
    (g) supplying said product gas to a primary energy generator to generate mechanical or electrical power, wherein a heated fluid, either gas or liquid, is exhausted; and
    (h) indirectly heating at least one of said feedstock slurry and said char slurry, utilizing said exhausted heated fluid;

wherein steps (d), (e) and (f) directly follow one another.

2. The method of claim 1 wherein indirectly heating said feedstock slurry comprises generating steam or hot water, and utilizing said steam or hot water to heat a devolatilization reactor adapted to accept the feedstock slurry.

3. The method of claim 1 wherein indirectly heating said char slurry comprises heating a gasification reactor adapted to accept said char slurry.

4. The method of claim 1 wherein indirectly heating said char slurry comprises inputting the exhaust gas into to a process air temperature booster and utilizing an output of said process air temperature booster to heat a gasification reactor adapted to accept said char slurry.

5. The method of claim 4 further comprising combusting said product gas in said process air temperature booster to heat the exhaust gas.

6. The method of claim 1 further comprising scavenging heat from said product gas, and pre-heating said feedstock slurry utilizing the scavenged heat, prior to devolatilizing said feedstock slurry.

7. The method of claim 1 wherein said primary energy generator is a fuel cell.

8. The method of claim 1 wherein said primary energy generator is selected from the group consisting of an internal combustion engine, a gas turbine and a boiler.

9. The method of claim 1 wherein said carbonaceous feedstock comprises waste selected from the group consisting of municipal waste, farm waste, food processing waste and combinations of two or more thereof.

10. The method of claim 1, without the further addition of reagents or fluids to the process stream, with the exception of steam pressurization, and without the venting of fluids from the process stream.

11. A method for processing a carbonaceous feedstock, the method consisting of:
    (a) providing a carbonaceous feedstock;
    (b) preparing a feedstock slurry from said carbonaceous feedstock, wherein said feedstock slurry comprises between 40% and 80% water;
    (c) optionally pre-heating said feedstock slurry prior to devolatilizing;
    (d) devolatilizing said feedstock slurry at a pressure between 300 and 900 psia such that the water in the slurry does not flash to steam while heating at a temperature between 300 and 600 degrees F. for between 5 and 30 minutes, to generate a char slurry comprising char and between 40% and 80% water;
    (e) introducing a pressure decrease in the flow of said char slurry from the devolatilization step to the gasification step, such that at least a portion of the water flashes to steam to produce a steam char slurry; and
    (f) subjecting said steam char slurry to gasification at a temperature between 1500 and 2000 degrees Fahrenheit, to generate a product gas comprising methane.

* * * * *